Figure 1:
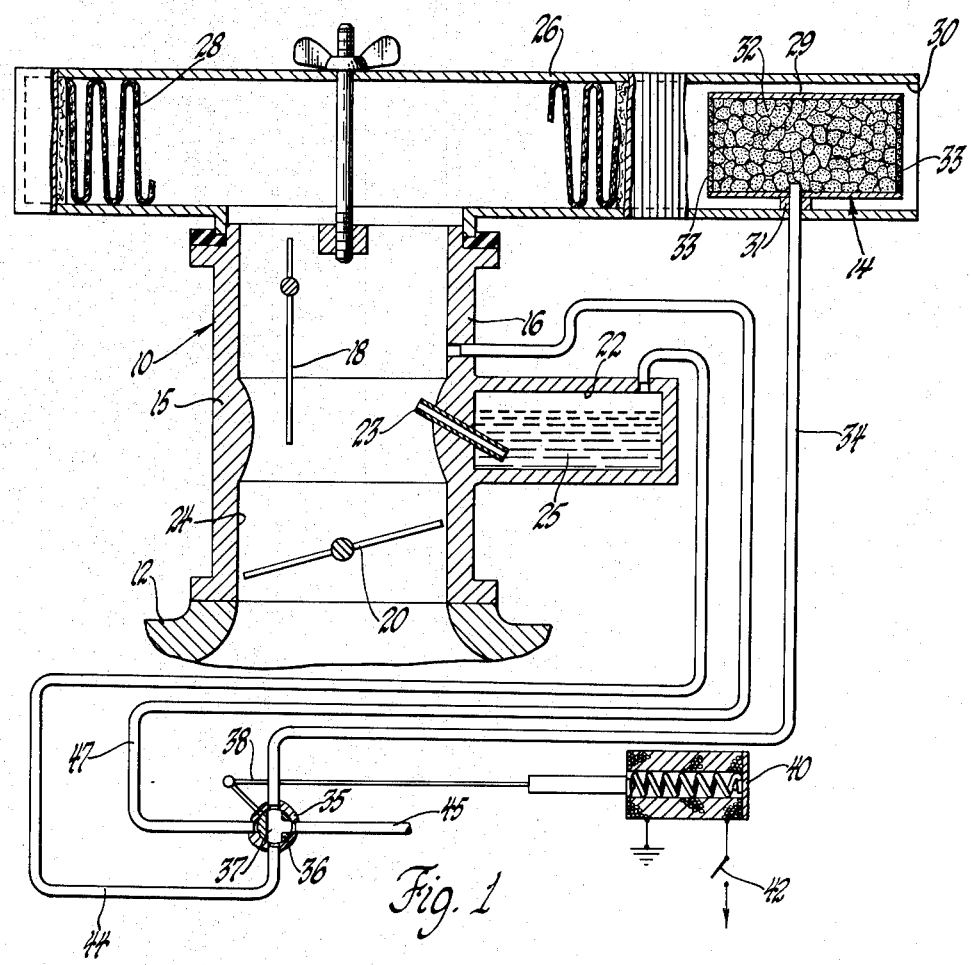

Dec. 7, 1965  J. T. WENTWORTH  3,221,724
VAPOR RECOVERY SYSTEM
Filed Jan. 27, 1964

INVENTOR.
Joseph T. Wentworth
BY
J. L. Carpenter
ATTORNEY

United States Patent Office 3,221,724
Patented Dec. 7, 1965

3,221,724
VAPOR RECOVERY SYSTEM
Joseph T. Wentworth, Royal Oak, Mich., assignor to General Motors Corporation, Detroit, Mich., a corporation of Delaware
Filed Jan. 27, 1964, Ser. No. 340,298
4 Claims. (Cl. 123—136)

This invention relates to a vapor recovery system for the fuel system of an internal combustion engine. In particular, gasoline vapors given off by the fuel tank and carburetor of an engine while shut off are adsorbed temporarily by a vapor adsorbent, such as activated charcoal. When the engine is running the fuel vapors are desorbed and conducted through the fuel system and burned in the combustion chambers of the engine.

Vehicle hydrocarbon emissions contaminate the atmosphere of cities at the rate of thousands of tons per day. A good percentage of this contamination is believed to be due to gasoline vapors which escape from automobile carburetor and gasoline tank vents. With more and more passenger vehicles being put in use every day this problem is becoming more serious.

While a complete solution to the hydrocarbon emission problem requires a consideration of vehicle exhaust gas discharges and other sources of air pollution, an important segment of the whole problem is the evaporation of gasoline vapors from the fuel systems of automobiles. Hence, an inexpensive and effective solution to this problem would help to reduce air pollution.

It has been proposed to reduce the evaporation loss to the atmosphere by trapping the escaping vapors on an adsorbent material, such as activated charcoal, attached to the vehicle fuel system vents. One of the first questions to be considered is whether the adsorbent material should be large enough to accept all of the vapors for an indefinitely long period of service, and then be discarded or exchanged, or whether a smaller adsorbent bed should be used which could be periodically reactivated or stripped of adsorbed vapors in normal use. Our experience has shown that the evaporation losses from the automobile fuel system, especially on hot days, can be of such magnitude that an adsorbent bed based on the former approach would have to be prohibitively large.

A system utilizing the reactivation approach is disclosed in the United States Patent 3,093,124 issued June 11, 1963 to the assignee of the present invention.

In this system, vapors given off from the carburetor float bowl and gasoline tank while the engine is off are captured in an adsorbent canister encircling the exhaust pipe. Each time the car is driven the canister will be heated and the adsorbent material purged of the trapped fuel vapors. The desorbed vapors are piped to the engine intake manifold and consumed. All vapors escaping from the carburetor or gasoline tank while driving bypass the adsorbent canister and are vented directly to the intake manifold. Having been reactivated while driving, the adsorbent material will be ready to accept vapors during the next shut-down period. Since this material need only hold vapors given off between trips, the bed may be much smaller than that required for a noncycling type of adsorbent bed. Relatively high temperatures are required to reactivate the canister when activated charcoal of the common gas-adsorbent type is used. These charcoals have the largest possible number of small diameter pores to obtain maximum adsorptive capacity with high retentivity. However, the smaller pores necessitate reaching temperatures of from 300° to 400° F. to drive the adsorbate off.

The present invention is an improvement over the above-described vapor recovery system.

Activated charcoal having a pore size distribution better suited to the collection and desorption of gasoline vapors is now available. This improved charcoal has more pore volume concentrated in somewhat larger pores than the usual gas-adsorbent charcoal, and may be reactivated at temperatures between 100° F. and 250° F. Since reactivation is essential to the scheme of retaining a compact size, the ease with which an adsorbent is reactivated is an important consideration in the design of a vapor recovery system.

In accordance with this invention, a fuel vapor recovery system is provided in which a low reactivating temperature adsorbent is used. This makes it possible to locate the adsorbent bed within the engine air intake passages leading directly to the intake manifold. When the engine is off, vent lines from the carburetor float bowl and the fuel tank deliver raw gas vapor mixtures to the adsorbent where they are accepted and stored. When the engine is started, the air sucked through the air intake and carburetor is soon heated to the ambient underhood temperature of the engine compartment. This air passes through and around the adsorbent bed heating it to its reactivation temperature thus driving off the trapped fuel vapors. These vapors are carried to the combustion chambers of the engine and burned. When the engine is again shut off, fuel vapor concentration begins to build up while the adsorbent bed is gradually cooling off. With proper design, vapor pressure build up can be matched with the size and shape of the bed so that the adsorption process keeps pace with the evaporation rate.

Figure 2:
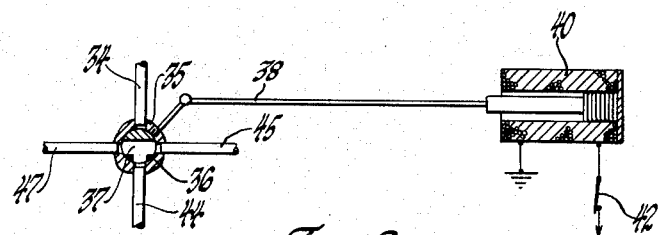

A better understanding of the invention may be had by referring to the following description and drawings wherein:

FIGURE 1 is a schematic view of a portion of an engine fuel system incorporating the invention showing a typical carburetor and air cleaner assembly; and FIGURE 2 is a fragmentary view of FIGURE 1, showing the condition of the vapor recovery system when the engine is running.

Referring to FIGURE 1, a typical carburetor and air cleaner assembly 10 is shown. This assembly is mounted on the intake manifold 12 of an engine fuel system incorporating the inventive vapor recovery system generally designated by the numeral 14.

The carburetor 15 has an air horn 16 containing a choke valve 18 and a throttle valve 20. A fuel well 22 connects through a discharge nozzle 23 with the throat 24 of the air horn and contains a metered quantity of gasoline 25 to be mixed with air passing the nozzle 23 and consumed in the engine combustion chambers. An air filter 26 mounted on the carburetor contains a paper filter element 28 located between the air horn 16 and the air cleaner intake 30.

The vapor recovery system 14 includes an adsorbent bed 32 located in the air intake 30 of the air cleaner. The bed consists of an adsorbent material, such as activated charcoal, and is mounted in a canister 29 coaxially spaced from the walls of the slightly enlarged air intake so that air can flow freely through and around it. Any suitable means of support may be provided, such as sleeve 31. The ends of the canister are closed with fine screens 33 which retain the adsorbent and allow some air to sweep through the bed when the engine is running.

FIGURE 1 shows the condition of the system when the engine is off. A vapor duct 34 leading from the bed 32 through sleeve 31 connects with a vapor distribution valve 35 schematically represented here for descriptive purposes. A rotatable valve element 36 having a T-shaped passage 37 is illustrated as being operated through the linkage 38 by a solenoid 40 controlled by the ignition switch 42. Of course, other suitable means may be used to control the valve 35 such as a diaphragm activated by engine oil pressure. In the off position, the valve element 36 connects the vapor duct 34 with the vent conduit 44 leading to the carburetor fuel well 22 and with the vent line 45 leading to the vehicle fuel tank. Hydrocarbon emission from these fuel storage areas will continue until the system is saturated at which time the effluent vapor pressure causes penetration of the bed 32 and adsorption of the fuel vapors.

When the engine has just been turned off, the bed 32 will remain at a fairly high temperature as a result of the previous trip and will be unable to adsorb any appreciable amounts of vapor. However, immediately after engine shut-down very little vapor is given off and vapor concentration is low. In time, the vapor concentration builds up, but by this time the bed 32 will have cooled to the point where it can accept and keep pace with the rate of evaporation.

When the engine is started the valve element 36 is rotated to the position shown in FIGURE 2 by the solenoid 40 which is energized when the ignition switch 42 is closed.

In this position the vent conduits 44 and 45 are connected directly to the air horn 16 through bypass line 47 and the vapor duct 34 is closed. Hence, fuel vapors in the fuel well 22 and in the vehicle gas tank will be conducted into the carburetor throat 24 and burned in the engine when it is running.

During this period of operation, air is drawn through the air intake 30 of the air cleaner and passes through and around the bed 32. The walls of canister 29 may be perforated to permit free air movement. This air is heated to the ambient underhood temperature of the engine compartment and has sufficient latent heat to bring the temperature of the bed 32 to its reactivation temperature. This temperature is reached in a matter of minutes and as a result, substantially all of the stored fuel vapors accepted during the shut-down period are given up in about 15 minutes. An important advantage over the system described in Patent 3,093,124 is the air sweep effect. That is, vapor molecules are desorbed and become entrained in the moving air stream much faster than where a closed canister is used and desorption vapor pressure is relied on to convey the gases to the engine.

The desorption phase should be short, but not so rapid as to overenrich the fuel mixture. Also, since 15 minutes is about the average minimum time required for most urban trips, it is assumed that the bed will be reactivated after nearly every run. The rate at which desorption proceeds will depend primarily on the properties of the charcoal desiccant, the temperature, and the air flow rate around the bed. Adjustment of these factors will result in a rate of desorption which will permit the reactivation of the bed in a reasonably short time and yet not cause undue richening of the air-fuel mixture entering the engine. The bed location may be a matter of choice so long as it is in the air stream moving to the carburetor. A location on the downstream side of the filter element 28 may be desirable in preventing contamination from dirt.

Experience indicates that there is an optimum range of pore sizes for greatest adsorption of any hydrocarbon vapor. For a gasoline burning fuel system the most effective gas adsorbent charcoals should retain the hydrocarbons of 4 to 6 carbon number when mixed with air at a concentration of about 10% by volume. It is expected that in actual service the vapor concentration in a fuel system will be in this range. The size of the charcoal particles is not too critical, but I have found that the sieve fraction between 30 and 70 mesh serves well.

Activated charcoal consists of tiny pores of various diameters. The pore diameters found in gas-adsorbent charcoals such as those used in the present invention may range from 5 Angstroms to many thousands of Angstroms. The pore size distribution is determined primarily by the raw material used and the method of activation. Less smallest pores are the most active and are first filled. Less volatile adsorbates will displace the more volatile which will then occupy larger diameter pores or be desorbed altogether.

The smallest pores (up to about 20 Angstroms in diameter) hold vapors most tenaciously but increase the difficulty of desorption. Larger pores (from about 20 to 60 Angstroms) will still retain hydrocarbon vapors and the vapors can be desorbed more easily, that is, at a lower temperature or in less time or both. Pores larger than about 60 Angstroms are less effective in holding vapors of the kind vented from automobile fuel systems.

Activated charcoal is now available which has a considerable portion of its pore volume concentrated in the desired size range. For example, improved charcoal having a total pore volume of 1.53 ml./gram may have more than 0.4 ml./gram in pores ranging from 20 to 60 Angstrom diameters. This charcoal can be reactivated at temperatures of from 100 to 250° F., which is within the range of air temperatures commonly found in the underhood space of operating automobiles. In contrast, this temperature range is considerably lower than the 300 to 400° F. range found necessary in the previously mentioned system disclosed in U.S. Patent 3,093,124. Other desiccants may be used such as activated aluminas and bentonites, but activated charcoal having the above characteristic is preferred.

Having now described my invention in detail and the most preferred embodiment thereof, it is clear that certain obvious modifications may be made by those skilled in this art without deviating from the scope of the invention and expressed in the appended claims.

I claim:

1. A fuel vapor recovery system for the fuel system of an internal combustion engine comprising, a fuel-air mixture intake passage means for the engine,
a fuel reservoir,
air inlet means for the fuel-air mixture intake passage means including an air cleaner assembly having air duct means and containing a filter element therein,
fuel vapor adsorption means located in said air duct means and being heated by the air stream moving within the air duct means when the engine is running to cause desorption of stored fuel vapors,
vent passage means leading from the fuel reservoir and connecting with the vapor adsorption means,
a bypass passage means connecting between the vent passage means and the fuel-air mixture intake passage means,
valve control means associated with said engine, and
valve means responsive to said valve control means to close the bypass passage means when the engine is not running and to close the vent passage means when the engine is running so that fuel vapors from said reservoir are temporarily accepted and stored by the vapor adsorption means when the engine is off and are bypassed to the fuel-air mixture intake passage means when the engine is running.

2. A fuel vapor recovery system for the fuel system of an internal combustion engine comprising, a carburetor having a throttle restricted throat and a fuel well communicating therewith,
air inlet means for said throat including an air cleaner assembly having air duct means and containing a filter element therein,
a fuel reservoir containing fuel to be consumed by the engine,
a gas-adsorbent activated charcoal bed located in said air duct means, said bed being heated by air moving in the air duct means and passing around and through the bed when the engine is running causing desorption of stored fuel vapors therein,
vapor distribution valve control means energized by the engine ignition system,
vapor distribution valve means responsive to said valve control means to direct fuel vapors from said fuel well and reservoir to said charcoal bed to be accepted and stored therein when the ignition is off and to direct said fuel vapors directly to said carburetor throat when the ignition is on, a first vent passage leading from the fuel reservoir to said valve means and communicating with said throat when the ignition is on, a second vent passage leading from said fuel well to said valve means and communicating with said throat when the ignition is on, and a vapor duct leading from said charcoal bed to said valve means and communicating with said first and second vent passages when the ignition is off.

3. A vapor recovery system according to claim 1 wherein said vapor adsorption means is activated charcoal having the maximum possible number of pores with diameters of from 20 to 60 Angstroms.

4. A vapor recovery system according to claim 1 wherein said vapor adsorption means has a pore volume of about 1.5 ml./gm., preferably with at least 0.4 ml./gm. between 20 and 60 Angstroms.

References Cited by the Examiner

UNITED STATES PATENTS

| | | | |
|---|---|---|---|
| 3,001,519 | 9/1961 | Dietrich et al. | 123—136 |
| 3,048,157 | 8/1962 | Gregory et al. | 123—136 |
| 3,093,124 | 6/1963 | Wentworth | 158—36 |

RICHARD B. WILKINSON, *Primary Examiner.*